United States Patent [19]

Smith et al.

[11] 4,130,171
[45] Dec. 19, 1978

[54] APPARATUS FOR BATCH-WEIGHING A CONTINUOUS FLOW OF MATERIAL

[75] Inventors: James M. Smith, Golden; Wilson S. Howe, Longmont, both of Colo.

[73] Assignee: Industrial System Engineers, Inc., Englewood, Colo.

[21] Appl. No.: 715,294

[22] Filed: Aug. 18, 1976

[51] Int. Cl.² .............................................. G01G 11/04
[52] U.S. Cl. ........................................ 177/1; 177/25; 177/83; 177/91; 177/114
[58] Field of Search .................. 177/1, 25, 60, 83–88, 177/91, 16–19, 103, 114, 116, 210 R, 211, DIG. 3, 165; 235/151.33

[56] References Cited

U.S. PATENT DOCUMENTS

| | | | |
|---|---|---|---|
| 1,186,406 | 6/1916 | Kleiser | 177/66 |
| 1,971,807 | 8/1934 | Bates | 177/84 |
| 3,063,635 | 11/1962 | Gordon | 364/567 |
| 3,966,000 | 6/1976 | Allen | 177/1 |

*Primary Examiner*—Joseph W. Hartary
*Attorney, Agent, or Firm*—Frank C. Lowe

[57] ABSTRACT

This invention pertains to a method to batch-weigh a continuous flow of material. The material flows into a holding container which cyclically drops a load into a weighing container and then continues to receive the flow of material. Before the holding container is again filled, the load in the weighing container is weighed, emptied and, if necessary, again weighed to measure tare weight. The weighing container is then ready to receive another load from the holding container. The material emptied from the weighing container drops into a hopper from whence it continues to flow, as upon a conveyor belt.

11 Claims, 18 Drawing Figures

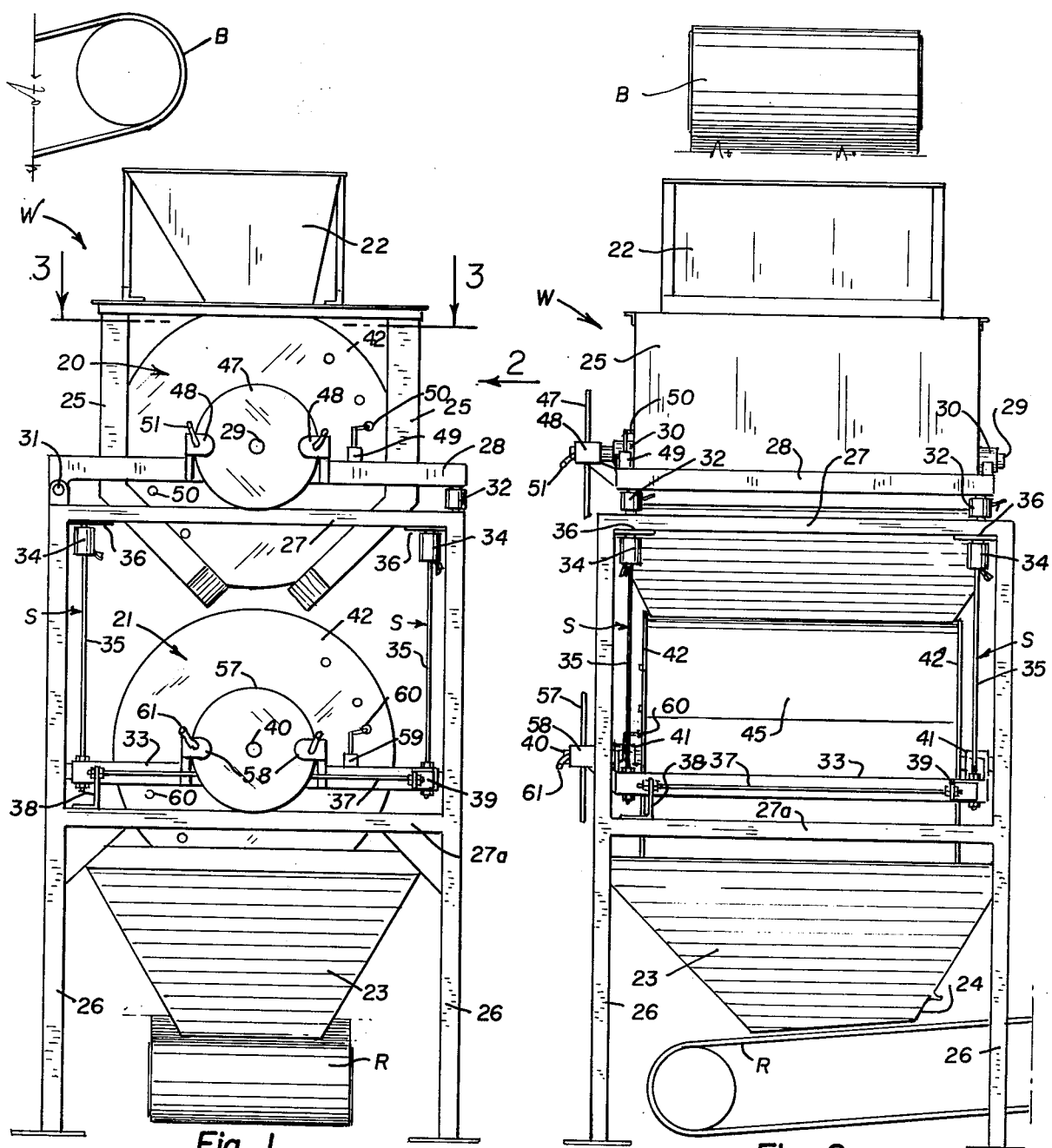
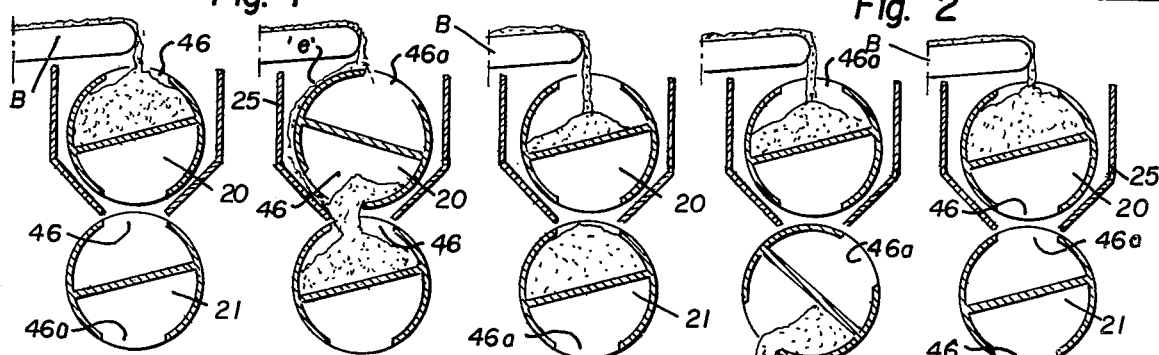
Fig. 1  Fig. 2
Fig. 10a  Fig. 10b  Fig. 10c  Fig. 10d  Fig. 10e

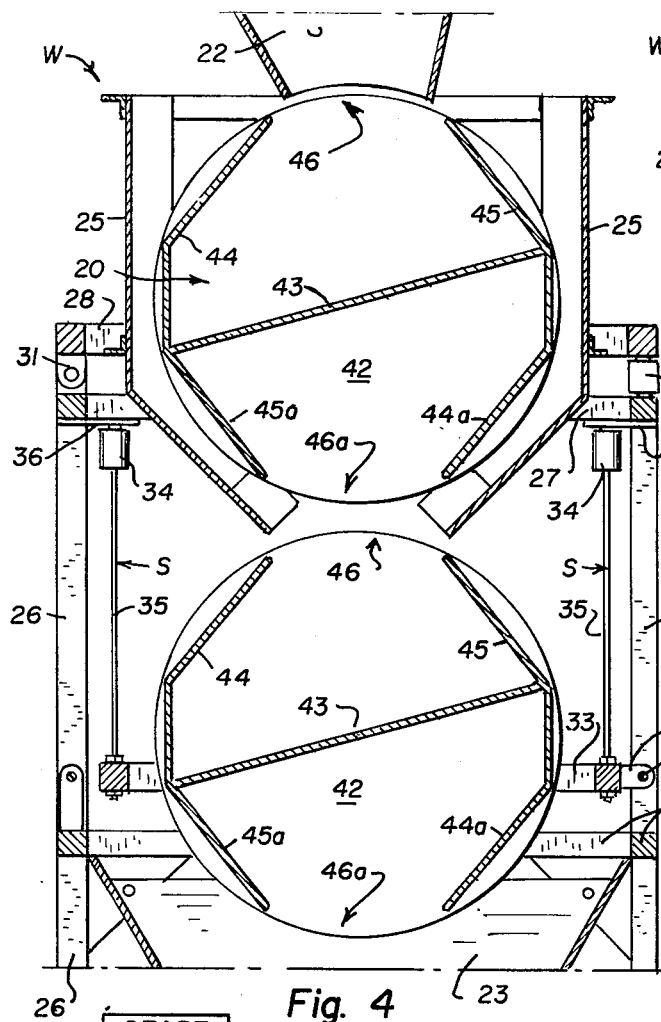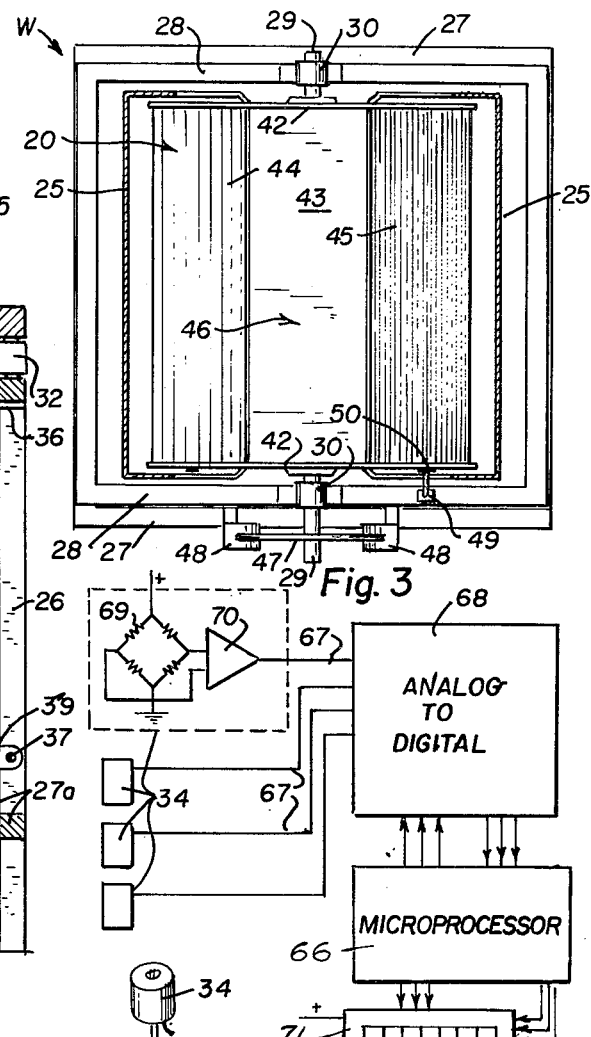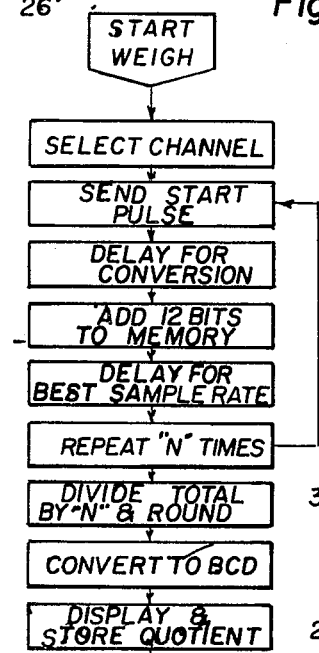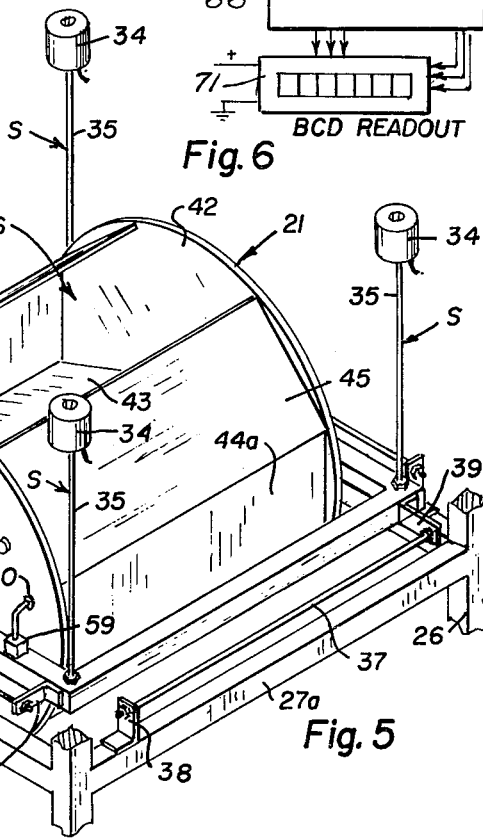

U.S. Patent  Dec. 19, 1978  Sheet 3 of 3  4,130,171
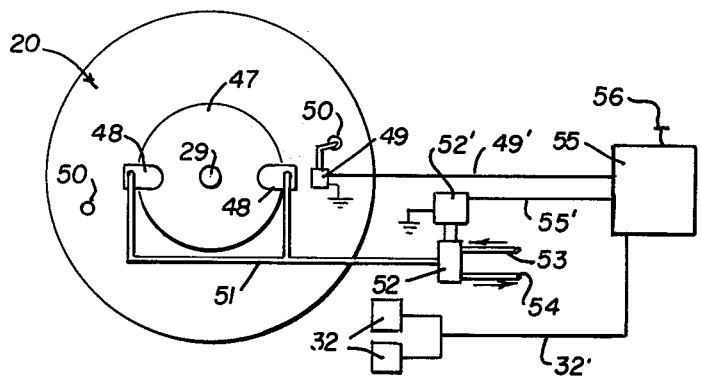
Fig. 8
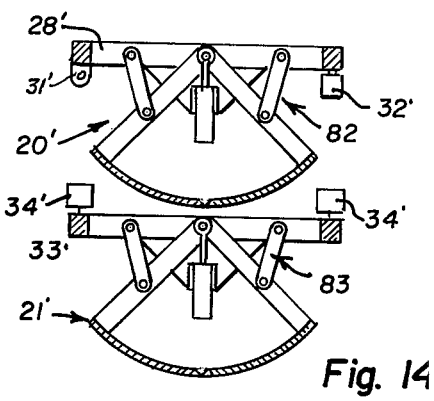
Fig. 14
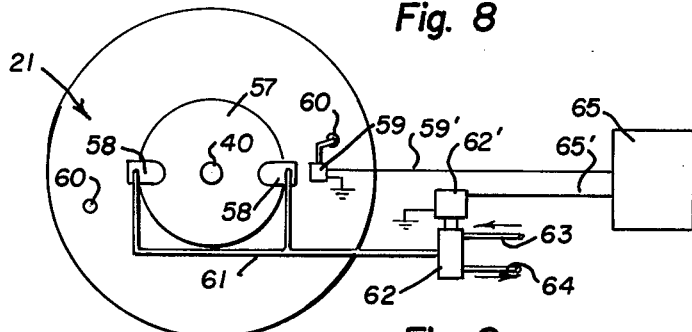
Fig. 9
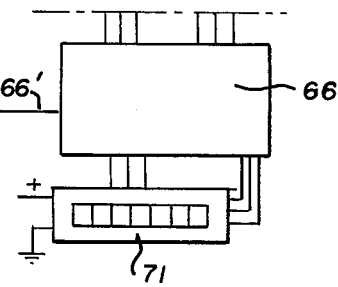
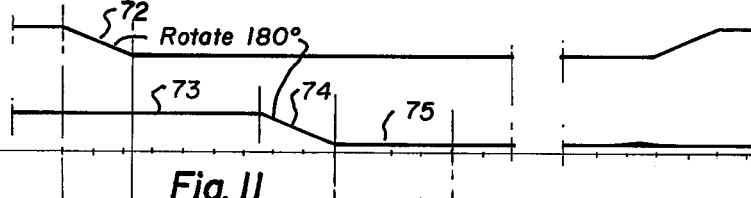
Fig. 11
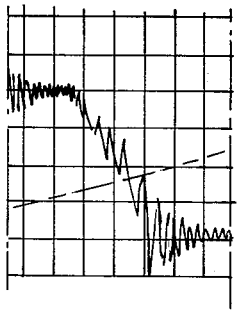
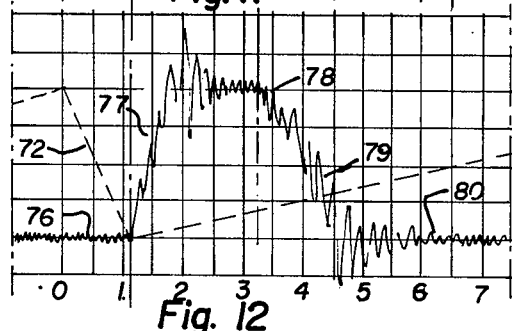
Fig. 12
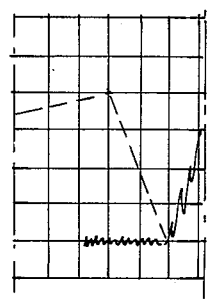
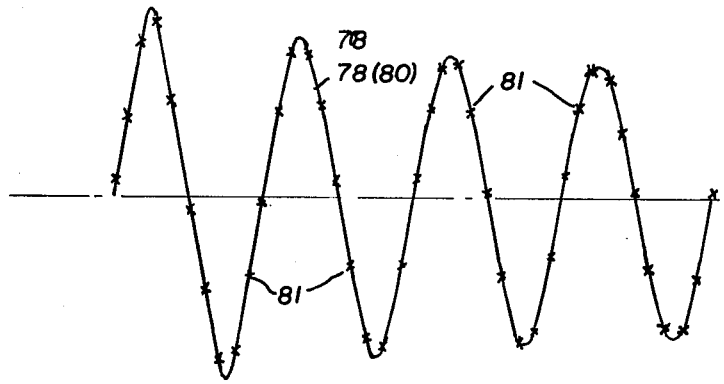
Fig. 13

APPARATUS FOR BATCH-WEIGHING A CONTINUOUS FLOW OF MATERIAL

The present invention relates to weighing apparatus, and more particularly to apparatus for weighing a continuous flow of particulate material, such as that which may be carried upon a conveyor belt.

A number of systems for weighing a continuous flow of particulate material are in use or have been proposed. One type of apparatus will weigh the conveyor belt and its load adjacent to a point of discharge by providing a running average of weight upon the belt. Then, knowing the belt speed, the total load may be determined. However, the accuracy of such a method, and similar methods of continuous weighing, is less than desired, and whenever a continuous weighing operation is used, it can be considered as being only an approximation of the actual weight of the material.

To provide better accuracy, batch weighing is used where a flow of material from a conveyor belt drops into a container which will discharge as soon as a specified load of particulate material is received and weighed. The material will then continue its journey. Where the material is dropped into a truck or is otherwise retained as a batch and a suitable time interval is available for weighing, this system is satisfactory. The weight of the load will be measured with an accuracy which depends upon the accuracy of the scales if the time interval permitted for the weighing operation is sufficient. It is necessary in such an operation for the system to stabilize itself before weighing can proceed, and often, this may take a minute or longer. This may necessitate stopping the conveyor belt during the weighing operation.

Several problems arise in the batch method of weighing a continuous flow of particulate material when the conveyor belt cannot stop and when the material must be placed upon a conveyor receiving belt after it is weighed. The relationship of the size of the weighing apparatus to the amount of material flow may be significant. Also, in placing material onto the receiving belt after a batch of material is dropped from the weighing container, the load must be held in a hopper, or the like, which permits it to flow onto the receiving belt in a uniform manner.

The weighing container must be quite large compared with the rate of material flow when a substantial time interval is required for an accurate weighing operation. The material moving on the belt must be held and stored in a holding container while the material in the weighing container is being weighed. Subsequently, the material in the holding container must be weighed. Thus, where a large amount of material is moving on the belt, say 20 tons per minute, the size of the containers can become excessive if an ordinary time interval of a minute or more is necessary for the weighing operation. Another problem concerns the tare weight. This problem will arise if the material is not absolutely dry or if it is sticky and there is a chance for a slug of material to stick at the floor or a corner of the weighing container and not release. This can happen intermittently and unexpectedly and can create a significant non-compensating error.

To summarize, the existing batch type weighing systems for a continuous flow of material, especially for large quantities of material, are unsatisfactory because they are too slow and must be excessively large. There is a real and definite need for an improved weighing apparatus and an improved method to provide quicker and more accurate weight measurements of particulate material carried upon a conveyor belt. This need is especially apparent where large quantities of material are to be moved. For example, the newly developing oil shale industry will contemplate handling 10,000 to 50,000 tons of ore per day per unit, and the weight of this material must be known and compared with the output at all times. Such large amounts of material must be weighed rapidly without interfering with its flow to the kiln. Other industries are faced with similar problems concerning the flow of large quantities of material, problems which have not heretofore been completely resolved.

The present invention, an improved weighing system, was conceived and developed with such and other considerations in view, and the invention comprises, in its preferred form, a batch-type weigher wherein the holding and weighing containers are compartmented, rotatable drums, one above the other. Each has two compartments. The upper compartment of the upper holding drum receives a batch of material from a supply conveyor belt above the drum. It then rotates to drop the batch of material into the lower weighing drum and continues to receive material in its other compartment, now at the upper position. The material is weighed in the lower drum and is then dropped into a feed hopper to flow onto a receiving conveyor belt.

In this preferred embodiment of the invention, each drum is preferably similar in form to the other to minimize production costs and operational problems. Each is normally held by a brake and a load imbalance within the drum initiates rotation through a 180° arc whenever the brake is released. The small amount of excess material dropped upon the upper holding drum while it is rotating is deflected to the lower drum for weighing to prevent errors from that source. The lower weighing drum is suspended from a symmetrical array of load cells. Using an electronic computing system associated with the load cells, the weighing information is converted to digital values. A number of readings can be recorded, averaged and summed by the computer. Once the load is weighed and the lower drum is emptied, it may be again weighed empty to establish a tare weight, if necessary.

The present invention involves a method for dynamically weighing the lower drum. Vibration of the drums and the supporting structure is initiated by dropping a load into the weighing drum, and the present invention does not wait for this vibration to stabilize and attenuate. By taking an average of many weight measurements, made at microsecond intervals, it is possible to establish an accurate weight of the load in the drum in a remarkably short time. The actual time required to make a precise measurement of the weight of the loaded, vibrating drum is in the range of one-half second and an entire cyclic sequence of the system, handling a ton of material in each cyclic sequence, requires a time interval in the range of 4 to 7 seconds. The improved system, using small sized drums, will outperform much larger batch-type weighing systems which may be similar in some respects, but which have heretofore been tried without practical success.

An apparatus, which exemplifies the preferred embodiment of the invention as hereinafter described in detail, was tested extensively by the Colorado Fuel and Iron Company at Pueblo, Colorado. It performed so successfully that it was certified by the State Department of Weights and Measures as being able to weigh a continuously moving load with an accuracy of 0.02 percent, or better.

It follows that the primary object of the invention is to provide a novel and improved weighing apparatus and weighing system which is capable of weighing a continuous flow of particulate material quickly and accurately with a minimum of disruption of the flow of the system.

Another object of the invention is to provide a novel and improved weighing apparatus and weighing system for a continuous flow of particulate material which accurately weighs the material as a sequence of batches so rapidly as not to disrupt the continuous flow of material and in a manner which does not require the apparatus to stabilize before weighing each individual batch.

Another object of the invention is to provide a novel and improved weighing apparatus and system for weighing a continuous flow of particulate material carried upon conveyor belts which is easily calibrated, which checks tare weight, and which converts the information obtained at load cells to digital values capable of storage, averaging and recall in a computer.

Other objects of the invention are to provide a novel and improved apparatus and system for weighing a continuous flow of particulate material which is quick, accurate and reliable and which provides for a low cost, rapid, economical, easily installed system.

With the foregoing and other objects in view, all of which more fully hereinafter appear, our invention comprises certain constructions, combinations and parts and elements, and sequences, steps and operation, all as hereinafter described, defined in the appended claims and illustrated in the accompanying drawing, in which:

FIG. 1 is a side elevational view of the weighing apparatus showing a fragment of a supply conveyor belt at the top of the apparatus and the end portion of a laterally directed receiving conveyor belt at the bottom of the apparatus.

FIG. 2 is an end elevational view of the apparatus, as from the indicated arrow 2 of FIG. 1.

FIG. 3 is a plan view of the apparatus, partly in section, as from the indicated line 3—3 of FIG. 1.

FIG. 4 is a sectional elevational view as taken from the indicated line 4—4 of FIG. 3.

FIG. 5 is a diagrammatic, isometric view of the manner in which the weighing drum is suspended upon load cells.

FIG. 6 is a block diagram of the weighing circuit and the computer components associated therewith.

FIG. 7 is a sequential block diagram of a flow chart required to program the computer for weighing operations in accordance with the principles of the invention.

FIG. 8 is a diagrammatic view of hydraulic and electrical circuits controlling the upper holding drum.

FIG. 9 is a diagrammatic view of hydraulic and electrical circuits controlling the lower weighing drum.

FIGS. 10a through 10e are diagrammatic sectional views of the drums showing various operative positions.

FIG. 11 is a line diagram showing a basic time sequence for rotative operations of the drums.

FIG. 12 is a diagram associated with FIG. 11 showing the loading and vibration of the apparatus, as sensed by the load cells when the drums are being filled and emptied.

FIG. 13 is a fragmentary portion of the diagram shown at FIG. 12 on a greatly enlarged scale to better indicate the load measurements being taken while the system is vibrating for conversion to digital values which may be subsequently averaged for a precise weighing operation in accordance with the principles of the invention.

FIG. 14 is a diagrammatic view of an alternate embodiment of the invention where clamshells are substituted for drums to reduce the overall height of the apparatus.

Referring first to FIGS. 1–5 of the drawing, the weighing apparatus W is mounted between a supply conveyor belt B terminating at the top of the apparatus and receiving conveyor belt R originating at the bottom of the apparatus. Particulate material, rocks, slag, grain, coal and the like, thus fall from the supply belt B to move through the weighing apparatus where it is weighed before dropping onto the receiver conveyor belt R and thence to its destination.

This weighing apparatus W includes an upper holding drum 20 and a lower weighing drum 21 carried upon a framework, hereinafter described. A hopper 22 is positioned above the weighing drum 21 to confine the flow of material from the supply belt B of the apparatus. A hopper 23 below the weighing drum receives the material after it has been weighed. The base of this hopper 23 lies close to the receiving belt R with a side opening 24 to permit material to flow onto the receiving belt in a uniform manner. A pair of deflector chutes 25 at each side of the holding drum 20 drop material from the supply belt B directly into the lower weighing drum 21 whenever the upper holding drum is rotating and dropping its load in the lower weighing drum, as hereinafter described.

The framework supporting these members is a rectangular, essentially square arrangement of columns 26 tied together by horizontal cross beams 27. One group of cross beams 27 is at the top of the framework at the level of the holding drum. An intermediate group of cross beams 27a is at the level of the weighing drum. The cross beams 27 and 27a are located a short distance below the center axis of their respective drums to carry components which support and stabilize the drums, as hereinafter described. Other structural members, not shown, may be used to reinforce and stabilize these columns 26 and beams 27 and 27a making up the frame.

The upper holding drum 20 is mounted upon and within the embrace of a horizontally disposed, rectangular carrier 28 formed as a loop of suitable structural members, such as square tubes, welded together. The holding drum, a horizontally axised, cylindrical member, hereinafter further described, includes axial shaft portion 29 outstanding from each end to ride in bearing blocks 30 in this carrier 28. The width of the carrier 28 has approximately the same proportions as does the top frame beams 27 and one side of this carrier is mounted upon a top frame beam by a pair of offset hinges 31 which space the carrier approximately 6 inches above the beams 27. The opposite side of this carrier 28 is supported by a load cell 32 at one corner thereof and a spacer 32' at the other corner. Thus, the weight of the drum and a load of material within it can be measured by the load cells 32 with a moderate degree of accuracy.

The lower weighing drum 21 is mounted upon and within the embrace of a horizontally disposed, rectangular carrier 33 formed as a loop of structural members welded together. This carrier 33 is proportioned to fit within the columns 26 of the framework, and it is supported a short distance above the lower set of holding beams 27a by an array of suspension members S, each member consisting of a load cell 34 and rod 35 extending from one end of the load cell. A suspension member S is attached to each corner of the carrier 33 to extend upwardly to a gusset plate 36 at the corner of the upper beams 27 thereabove. The four load cells 34 will thus measure the entire weight of the load upon the carrier 33. This carrier is stabilized against lateral movement and lateral force components in the system are cancelled by torsion bars 37 at the sides of the carrier. One end of each torsion bar 37 is secured to an intermediate frame beam 27a by a clip angle 38 and the other end of the torsion bar is secured to a corner of the carrier 33 by a clip angle 39, as best shown at FIG. 5.

The weighing drum 21 supported by the carrier 33 is a horizontally axised, cylindrical member, the same as the holding drum 20, and includes axial shaft portions 40 outstanding from each end to ride in bearing blocks 41 mounted upon the carrier 33. Each drum 20 and 21 is preferably the same as the other to hold comparable loads and to simplify production problems. Each of bifold axial symmetry about its horizontally disposed axis, so that it may rotate at 180° intervals when the apparatus is in operation. The compartments of each drum are divided by a diammetrical floor plate 43 which is inclined approximately 15° from the horizontal when in an initial operative position, as best illustrated at FIG. 4. This inclination will facilitate rotation, as hereinafter described. A larger left side wall 44 and a shorter right side wall 45 extend upwardly from the sloping floor plate 43 and to an opening 46 at the top of the drum. A similar diammetrically opposite arrangement of sidewalls 44a and 45a extend downwardly and to an opening 46a at the bottom of the drum.

The width of each opposite opening 46 and 46a is such as to move material from the hopper 22 and to the holding drum 20; and thence from the deflector chute and upper drum 20 to the lower drum. The incline of the floor plate 43 is such as to provide an imbalance of each drum, so that, when the upper compartment is filled, the drum will automatically rotate 180° to drop its load. Since each drum 20 and 21 will rotate automatically because of an unbalanced load, it is necessary to restrain them until rotation is desired and then to permit them to rotate only 180°, bringing the opposite sides of the drums, the openings 46a, to the top position for receiving material. Release of a load from the upper drum 20 will occur when it is filled and/or when the lower drum 21 is ready to receive the load. Release of a load from the lower drum 21 will occur after the load has been weighed, all as hereinafter described.

A braking system controls the rotation of these drums. A braking disc 47 is secured to an extension of the shaft 29 of the holding drum. Hydraulically operated disc brakes 48 are attached to the carrier frame 28 adjacent to the disc 47 to embrace and hold the edge portion of the disc. A limit switch 49, also mounted on the frame 28, will engage a stop 50 on the plate 42 of the drum to properly index the rotative position of the holding drum 20 by application of the brakes. The control of the holding drum 20 is diagrammatically illustrated at FIG. 8. A hydraulic line 51 connects with the pads of the brakes 48 to release the pads when pressure is applied. A solenoid operated valve 52 connects the line with a suitable pressure source, line 53, and a suitable pressure relief, line 54. Energization of the solenoid 52' of valve 52 thus applies pressure to release the pads of brakes 48. The load cells 32 have circuits 32' extending to a control box 55, and whenever the cells indicate that the drum 20 is fully loaded, the circuit 55' from the control box 55 energizes the solenoid 52' to effect release of the brakes 48. When the drum is rotated 180°, the limit switch 49 is triggered and circuits 49' to the control box will cause the solenoid 52' to be deenergized to set the brakes 48 and stop the drum 20. The circuitry within the control box 55 can be conventionally arranged by any skilled electrician and need not be described. However, to complete the system, a manual switch 56 at the control box 55 is provided to release the brakes and rotate the drum when it is only partially full.

It is to be noted that the timing of the entire operation of filling and rotating the upper holding drum 20 will control the time interval of each weighing operation and that all of the cyclic operations of receiving, weighing, discharging and, if necessary, checking the tare weight of the lower weighing drum 21 must be performed within the time interval required to fill and rotate the upper drum 20.

A braking disc 57 is secured to an extension of the shaft 40 of the weighing drum, hydraulically operated disc brakes 58 are attached to the carrier frame 33 adjacent to the disc 57 to embrace and hold the edge portion of the disc. A limit switch 59, also mounted upon the frame 33, will engage a stop 60 on the plate 42 of the drum 21 to index the rotative position of the drum 21. The controls for the weighing drum are diagrammatically illustrated at FIG. 9. A hydraulic line 61 connects with the pads of brakes 58 to release the pads when pressure is applied. A solenoid operated valve 62 connects the line 61 with a suitable pressure line 63 and a relief line 64. Energization of the solenoid 62' of valve 62 thus applies pressure to release the brake pads. The control of this solenoid 62' is through a circuit 65' from a control box 65 which, in turn, is controlled by a weighing computer 66 through a lead 66' connecting the two. The computer 66 will not permit the brakes to release the drum 21 until the weighing operation is completed, as in the manner to be described. Once the drum 21 rotates, however, a circuit 59' from limit switch 59 to the control box energizes to cause the brakes to apply and stop the rotation at the 180° position.

The basic weighing circuit and computer are shown at FIG. 6. The four load cells 34 are directed through leads 67 to an analog-digital converter 68. The basic elements of one load cell 34 is shown as being exemplary of the others. Each load cell 34 includes a transducer 69 to convert the strain imposed upon the load cell to an electrical signal which is suitably amplified by amplifier 70 and directed to the converter. A transducer 69 catalogued as BTC-FF-62-CS-1K by Transducers, Inc. of Whittier, California, and an instrumentation amplifier 70 178/278 MK, by Calex of Pleasant Hill, California, are suitable for this purpose. A suitable analog-digital converter 68 is a 12 bit Analogic MP 6812 by Data Acquisition System of Wakefield, Massachusetts. A suitable weighing computer 66 for the purpose at hand is a Microprocessor PLS 401 by Pro Log Corporation of Monterey, California. This computer 66 is connected to a display 71, such as T.J.L. 308 BCD driver decoder by Texas Instrument Company of Houston, Texas.

The arrangement of these computer components will be apparent to those skilled in the art and can easily be programmed by reference to the flow chart of FIG. 7. It is to be noted that the weighing operation is to be repeated 'N' times with a suitable delay to obtain the best sample rate. The 'N' weighings are then divided to obtain an average value which is displayed and stored.

The physical operation setting forth the cycles of loading and weighing are illustrated at FIGS. 10a through 10e. The actual weighing operations of the one-ton-per-weigh unit tested at the Colorado Fuel and Iron Company of Pueblo, Colorado, indicate a preferred timing thereof for that system, which will be further disclosed. However, it is to be understood that such is exemplary of the invention and that the timing will be somewhat different for different installations and especially installations having different drum capacities. FIG. 10b shows this drum rotating to drop its load into the weighing drum 21. Some material from the conveyor B will also drop into the weighing drum, falling about the holding drum and being confined and directed by the chutes 25, as indicated at 'e'. This unloading cycle requires approximately 1.25 seconds.

FIG. 10c shows the holding drum filling while the loaded weighing drum is permitted to stabilize and to be weighed. This operation requires approximately 2 seconds, although the actual weighing time will require only 0.5 second. FIG. 10d shows the holding drum 20 continuing to be filled while the weighing drum 21 is rotating to empty. This operation requires approximately 1.25 seconds. FIG. 10e shows the holding drum continuing to be filled while the tare weight of the weighing drum is measured. This operation requires approximately 2 seconds, although the weighing time is only 0.5 seconds. As soon as the tare weight is measured and the holding drum is filled, the entire operation can be repeated with the next batch of material. The time interval can be shortened if the tare weight is not measured.

FIG. 11 shows the rotation sequence of the upper holding drum 20 and the lower weighing drum 21. Time commences as the lower drum is filled. A 180° rotation is then initiated and requires a lapse of approximately 1.25 seconds, indicated at 72. Two seconds are then required to weigh the load, indicated at 73, and then rotation of the lower drum is initiated, at a time of 3.25 seconds. This rotation requires a lapse of 1.25 seconds, indicated at 74. This brings both drums to 180° beyond their initial position, and another lapse of 2 seconds, indicated at 75, may be required to weigh the empty drum 21. Thereafter, as soon as the upper drum is filled, any time after the 6.5 second lapse, the entire sequence can be repeated.

FIG. 12 illustrates the combined output of the load cells 34 of the weighing drum 21 during the time intervals shown at FIG. 11. This output indicates that the system is constantly vibrating. Such an output may be obtained on an oscillograph chart where time is the abcissa and load is the ordinate. This chart shows the performance of the 1-ton test apparatus heretofore referred to. Prior to O time, the load on the weighing drum 21 is zero, however, as indicated at 76, the entire system is vibrating. Near the end of the 1.25 second interval 72, the effect of receiving the load from the holding drum 20 produces a rapid increase in load on the weighing drum, accompanied by intense fluctuations of the load cell output, as at 77. For example, the impact effect of dropping a 2000-pound load into the weighing drum 21 causes fluctuations of as much as 750 pounds on the load cells.

During the succeeding 2 second weighing period 73, these fluctuations attenuate and stabilize as at 78, and during the last half second of this interval 73, the load is weighed by the computer by a sequence of individual weighings, as hereinafter described.

The following 1.25 second time interval 74 is when the weighing drum is rotated to discharge the load, and intense fluctuations of the load cell output again occur, as at 79. Such fluctuations attenuate during the subsequent 2 second period 75 to a mild intensity 80 which permits the load to be weighed by the computer during the last half second of this interval 75. This final weighing establishes the tare weight of the drum 21. The actual weighing of the load and tare weight of the drum 21, during the last half second of the time intervals 73 and 75 is not a weighing of a stabilized system, although the vibrations are diminished from the initial impact and release of the load in and from the drum 21.

Simple, single weight measurements, such as might be obtained by further attenuating these fluctuations with a filter, did not produce results having the desired degree of accuracy. Accordingly, a multiple of measurements at millisecond intervals, possible only with a computer, was used, and this multiple was then averaged out, as hereinabove mentioned. FIG. 13 shows a portion of the fluctuations 78, or 80, on a greatly enlarged scale, and with points 81 indicated where measurements are made with a computer. The fluctuations of output record actual vibrations of the system at a frequency of approximately 40 cycles per second. The readings are much more rapid, and it was found that precise weighings of load would result when approximately 250 weighings were taken and averaged during the critical one half second weighing period above described. In actual state tests to establish the accuracy and obtain acceptance of test unit at the Colorado Fuel and Iron Company, the precision and repeatability of results obtained was better than that which could be indicated on the standardized comparison scale furnished by the State. It is to be recognized that the actual values and time intervals selected may vary from one installation to another when using apparatus constructed and operated according to the present invention. Basically, as soon as the immediate impact effect of filling or releasing the load into or from the weighing drum has attenuated, but while the system is still vibrating, a dynamic weighing operation commences for a short time interval where a number of individual weighings are made during each cycle of vibration. To illustrate the capabilities of this system, it is to be pointed out that the one-ton unit tested at the Colorado Fuel and Iron Company is capable of cycling a ton of dry material 5 seconds (without measuring tare weight). Thus, a flow of as much as 10,000 tons per 24-hour day can pass through this apparatus W and be accurately weighed.

FIG. 14 depicts somewhat diagrammatically an apparatus capable of operation according to the present invention where holding and weighing members are clamshell buckets 20' and 21' and are used in lieu of drums to reduce the height of the installation. The holding bucket 20' is mounted upon a carrier 28' hinged at one side at 31' and with load cells 32' at the other side. The bucket is operated by a hydraulic linkage indicated at 82 mounted on the carrier 28'. The weighing bucket 21' is similar in structure, and it is mounted upon a carrier 33' which, in turn, is supported by load cells 34', the same as heretofore described. A hydraulic linkage, indicated at 83, operates this bucket 21'. It becomes manifest that weighing controls can be used with these buckets which are essentially the same as described for the drums 20 and 21. This arrangement, using the buckets, is exemplary of other similar arrangements which can be devised to operate according to the invention.

We have now described our invention in considerable detail. However, it is apparent that others skilled in the art can devise and build alternate and equivalent constructions which are nevertheless within the spirit and scope of our invention. Hence, we desire that our protection be limited, not by the constructions and operation illustrated and described, but only by the proper scope of the appended claims.

What is claimed is:

1. A method for rapidly weighing a continuous flow of material which drops into a holding container and loads from the holding container drop into a weighing container which vibrates when so loaded, with a transducer means carrying the container to convert weight and vibrational effects to an electrical output and with a computer means to convert the electrical output at any instant to a digital value and perform other computer operations, including the steps of:
   (a) permitting the holding container to receive and retain the flowing material until a load is accumulated therein;
   (b) dropping the load into the weighing container and permitting the initial peak vibrations of the container to attenuate to a more nearly uniform vibration pattern at a regular frequency;
   (c) thereupon, converting the transducer means output to a sequence of digital values at short time intervals in the general range of microseconds, and which are substantially less than the time intervals of the vibration frequency imposed upon the transducer means by the container;
   (d) continuing this conversion for a short time interval in the general range of one-half second;
   (e) averaging the sum of the digital values during said time interval and placing this average value in the display and/or memory of the computer; and
   (f) dropping the load from the weighing container and positioning the weighing container to receive another load before another load is accumulated in the holding container.

2. The method defined in claim 1, wherein the containers are rotatable drums having a two-fold symmetry with opposing compartments and wherein an upper compartment of the holding drum is filled, this drum is then permmitted to rotate 180° to empty into an upper compartment of the weighing drum, the weighing drum is weighed while material is flowing into the other compartment of the holding drum, the weighing drum is then permitted to rotate 180° to empty and the holding drum is thereafter permitted again to rotate 180° to drop the load accumulated therein into the other compartment of the weighing drum.

3. The method defined in claim 1 including dropping the load in the weighing container into a hopper.

4. An apparatus for weighing a continuous flow of particulate material received from a point above the apparatus, and comprising:
   (a) a holding container at the upper section of the apparatus normally positioned to receive the flow of material;
   (b) a means to drop the material from the holding container when a selected load is accumulated therein;
   (c) a weighing container below the holding container adapted to receive the selected load dropped from the holding container;
   (d) a transducer means carrying the weighing container to produce an electrical output responsive to the loading and vibrational fluctuations of the weighing container;
   (e) a computer means to convert said electrical output to digital values at selected short time intervals, average the same through a selected time sequence and display and store in memory the average value of weight; and
   (f) means to thereafter drop the material from the weighing container and to permit the weighing container to receive another load from the holding container.

5. The apparatus defined in claim 4, wherein each container is a rotatable drum mounted on a horizontally axised, having diametrically opposing openings therein, means to permit the drums to rotate through 180° arcs, with a compartment opening being at an upper position to receive flowing material from above, whereby rotation of each drum through the 180° arc will drop the material thereon.

6. The apparatus defined in claim 5, wherein a deflector means embraces the upper holding drum to deflect any material dropping upon the drum while it is rotating directly to the lower drum.

7. The apparatus defined in claim 5, wherein each compartment is offset from the normal stop position to initiate rotation of the drum by gravity action when the drum compartment is filled, and means to normally hold the drum, but to release the same for rotation when the drum is to be rotated.

8. The apparatus defined in claim 7, wherein the means to hold the drum is a brake means.

9. The apparatus defined in claim 4, wherein the transducer means is an array of load cells suspending the weighing container.

10. The apparatus defined in claim 9 including horizontal component restraint means associated with the weighing container.

11. The apparatus defined in claim 10, wherein the horizontal component restraint means are torsion bars.

* * * * *

UNITED STATES PATENT AND TRADEMARK OFFICE
CERTIFICATE OF CORRECTION

PATENT NO. : 4,130,171
DATED : December 19, 1978
INVENTOR(S) : James M. Smith and Wilson S. Howe It is certified that error appears in the above-identified patent and that said Letters Patent are hereby corrected as shown below:

Column 1, line 39, "aftet" should read -- after --.
Column 4, line 61, "materiaL" should read -- material --.
Column 5, line 21, the following words were omitted and should be inserted after "Each": -- drum 20 and 21 is closed at each end by a circular end plate 42 from whence the respective axial shafts 29 and 40 extend to support the drums in the respective bearing blocks 30 and 41.

Each drum 20 and 21 is a two compartmented structure --.

Signed and Sealed this

Twenty-fourth Day of April 1979

[SEAL]

Attest:

RUTH C. MASON
Attesting Officer

DONALD W. BANNER
Commissioner of Patents and Trademarks